(12) United States Patent
Dudar (10) Patent No.: US 10,246,103 B2
(45) Date of Patent: Apr. 2, 2019

(54) VEHICLE ODOR REMEDIATION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 167 days.

(21) Appl. No.: 15/585,777

(22) Filed: May 3, 2017

(65) Prior Publication Data
US 2018/0319406 A1    Nov. 8, 2018

(51) Int. Cl.
*B60W 50/00* (2006.01)
*B60W 10/06* (2006.01)
*B60W 10/30* (2006.01)

(52) U.S. Cl.
CPC ........ *B60W 50/0098* (2013.01); *B60W 10/06* (2013.01); *B60W 10/30* (2013.01); *B60W 2540/00* (2013.01); *B60W 2900/00* (2013.01)

(58) Field of Classification Search
CPC .......... B01D 2257/708; B01D 2258/06; B01D 2259/4516; B01D 53/04; G01N 1/2273; G01N 15/0227; G01N 1/26; G01N 33/0047; G01N 35/00871; B67D 7/0476; C10G 1/002; C10G 1/02; C10G 3/46; C10G 3/50; C12F 3/10; F24F 11/30; F24F 11/52; F24F 2110/50; F24F 2110/66; Y02A 50/235; Y02A 50/249; Y02E 50/16; Y02E 50/17; Y02P 30/20
USPC .................. 700/97; 422/98, 129; 423/437.1; 96/115; 210/638; 123/523; 510/179; 568/913; 435/99; 454/187; 455/456.3; 62/48.1; 73/31.01; 236/44 A; 524/80; 427/248.1; 250/578.1; 235/381
See application file for complete search history.

(56) References Cited

U.S. PATENT DOCUMENTS

| | | | | |
|---|---|---|---|---|
| 5,050,603 A * | 9/1991 | Stokes | ................ | B67D 7/0476 123/523 |
| 5,596,501 A * | 1/1997 | Comer | ................ | B67D 7/228 235/381 |
| 6,881,711 B1 * | 4/2005 | Gershun | ................ | C11D 3/044 510/179 |

(Continued)

FOREIGN PATENT DOCUMENTS

| | | |
|---|---|---|
| CA | 2219913 A1 | 11/1996 |
| CN | 202879201 U | 4/2013 |

(Continued)

OTHER PUBLICATIONS

Search Report from United Kingdom Intellectual Property Office dated Sep. 20, 2018 regarding Application No. GB1807188O6 (3 pages).

*Primary Examiner* — Kimberly S Berona
*Assistant Examiner* — Sanjeev Malhotra
(74) *Attorney, Agent, or Firm* — Frank A. MacKenzie; Bejin Bieneman PLC (57) ABSTRACT

A method includes detecting, based on a first location of a vehicle and weather data, a condition for removing volatile organic compounds (VOCs) from the vehicle. The first location is a current location of the vehicle. The process further includes determining that a level of VOCs in the vehicle is greater than a predetermined level. A second location is selected to expedite removal of the VOCs, and the vehicle is navigated to the second location.

20 Claims, 5 Drawing Sheets

(56) References Cited

U.S. PATENT DOCUMENTS

| | | | | |
|---|---|---|---|---|
| 9,297,301 B1* | 3/2016 | Joy | | B01D 5/009 |
| 2001/0055544 A1* | 12/2001 | Copp | | G01N 1/22 |
| | | | | 422/98 |
| 2002/0077716 A1* | 6/2002 | Shadow | | G05B 19/406 |
| | | | | 700/97 |
| 2008/0090944 A1* | 4/2008 | Nunez | | C09D 5/00 |
| | | | | 524/80 |
| 2008/0148816 A1* | 6/2008 | Groves | | G01N 1/2273 |
| | | | | 73/31.01 |
| 2009/0053989 A1* | 2/2009 | Lunde | | A61L 9/00 |
| | | | | 454/187 |
| 2009/0113990 A1* | 5/2009 | Groves | | G01N 1/2273 |
| | | | | 73/31.01 |
| 2011/0171106 A1* | 7/2011 | Yokoyama | | B01D 53/8696 |
| | | | | 423/437.1 |
| 2012/0118822 A1* | 5/2012 | Strickland | | F04B 15/023 |
| | | | | 210/638 |
| 2013/0309727 A1* | 11/2013 | Hamilton | | C12P 7/06 |
| | | | | 435/99 |
| 2014/0103231 A1* | 4/2014 | Su | | G01N 33/0047 |
| | | | | 250/578.1 |
| 2014/0161675 A1* | 6/2014 | Lee | | B01D 53/04 |
| | | | | 422/129 |
| 2014/0199484 A1* | 7/2014 | Larson | | B05D 3/0486 |
| | | | | 427/248.1 |
| 2014/0252099 A1* | 9/2014 | Hatton | | F24F 7/06 |
| | | | | 236/44 A |
| 2015/0105593 A1* | 4/2015 | Radtke | | C07C 29/76 |
| | | | | 568/913 |
| 2015/0260452 A1* | 9/2015 | Hofmann | | B65D 90/34 |
| | | | | 62/48.1 |
| 2016/0089960 A1* | 3/2016 | Zhang | | B60H 3/06 |
| | | | | 96/115 |
| 2017/0015177 A1 | 1/2017 | Isert et al. | | |
| 2017/0130981 A1* | 5/2017 | Willette | | F24F 3/16 |
| 2018/0025638 A1* | 1/2018 | Fulger | | G01C 21/3415 |
| | | | | 455/456.3 |
| 2018/0052097 A1* | 2/2018 | Waszak | | F02D 41/1451 |
| 2018/0057013 A1* | 3/2018 | Mullett | | B60W 50/0098 |
| 2018/0186212 A1* | 7/2018 | Kundu | | B60H 1/008 |

FOREIGN PATENT DOCUMENTS

| | | |
|---|---|---|
| CN | 203472611 U | 3/2014 |
| CN | 106280513 A | 1/2017 |
| DE | 102015006414 A1 | 12/2015 |
| EP | 1422089 A2 | 5/2004 |
| WO | WO 2015024154 A1 | 2/2015 |

* cited by examiner

VEHICLE ODOR REMEDIATION

BACKGROUND

Due to volatile organic compounds (VOCs) off-gassed by materials such as plastics, leather and vinyl in a vehicle, new vehicles typically have an odor often referred to as a "new car smell." Adhesives, glass cleaners and sealants from the manufacturing process also contribute to the new car smell. This odor typically persists for several months after the manufacture of a new vehicle. Some customers do not like this smell, and even become irritated or sick from the VOCs in the interior of a new vehicle.

DETAILED DESCRIPTION

A method includes detecting, based in part on a first location of a vehicle and weather data, a condition for removing volatile organic compounds (VOCs) from the vehicle, the first location being a current location of the vehicle. The method further includes determining that a first level of VOCs in the vehicle is greater than a predetermined level; selecting a second location to expedite removal of the VOCs; and navigating the vehicle to the second location.

In the method, the condition for removing volatile organic compounds can include an intensity of sunlight above a predetermined intensity. The condition can further include the second location being within a predetermined distance of the first location. The condition can further include an ambient temperature above a predetermined temperature.

In the method, selecting the second location can be based on an availability of sunlight with an intensity above a predetermined intensity at the second location and can also be based on the second location being an outdoor location.

The method can include executing a VOC removal operation including at least one of following actions: (1) opening at least one window of the vehicle; (2) activating at least one of a vehicle heater and a component heating element; (3) activating a fan; and (4) running an engine. The method can further include recording one or more parameters related to the VOC removal operation, wherein the one or more parameters includes at least one of: a period of time for the VOC for at least one of the actions of the VOC removal operation; a temperature of an interior of the vehicle at one or more times during the VOC removal operation; and an intensity of sunlight measured by a sensor in the vehicle during the VOC removal operation.

The method can further include estimating, based on the parameters, a second level of VOCs, the second level indicating a level of VOCs in the interior of the vehicle following the VOC removal operation. The method can further include determining that a vehicle user requested volatile organic compound removal from the vehicle.

The method can further include determining a minimum time period for removing VOCs from a vehicle, wherein detecting the condition for removing VOCs from the vehicle is based in part on the minimum time period. In the method, the minimum time period for removing VOCs from the vehicle can be based in part on a required time to heat an interior of the vehicle to a target temperature. In the method, detecting the condition for removing VOCs from the vehicle further can include determining that the vehicle is not scheduled to be used for a period of time greater than the minimum time period for removing VOCs from the vehicle. Detecting the condition for removing VOCs from the vehicle can further include predicting an amount of time the vehicle is available for removing VOCs from the vehicle; and determining that the predicted the amount of time available for removing VOCs from the vehicle is greater than the minimum time period for removing VOCs from the vehicle.

Further disclosed is a computer programmed to execute an of the above method steps. Yet further disclosed is a vehicle including the computer. Yet further disclosed is a computer program product, including a computer readable medium storing instructions executable by a computer processor, to execute any of the above method steps.

A computer is programmed to detect, based in part on a first location of a vehicle and weather data, a condition for removing volatile organic compounds (VOCs) from the vehicle, the first location being a current location of the vehicle. The computer is further programmed to determine that a first level of VOCs in the vehicle is greater than a predetermined level; select a second location to expedite removal of the VOCs; and navigate the vehicle to the second location.

In the computer, the condition for removing volatile organic compounds can include an intensity of sunlight above a predetermined intensity, and can further include an ambient temperature above a predetermined temperature.

The computer can further be programmed to execute a VOC removal operation including at least one of following actions: (1) opening at least one window of the vehicle; (2) activating at least one of a vehicle heater and a component heating element; (3) activating a fan; and (4) running an engine.

The computer can further be programmed to record one or more parameters related to the VOC removal operation, wherein the one or more parameters includes at least one of: a period of time for the VOC for at least one of the actions of the VOC removal operation; a temperature of an interior of the vehicle at one or more times during the VOC removal operation; and an intensity of sunlight measured by a sensor in the vehicle during the VOC removal operation.

The computer can further be programmed to estimate, based on the parameters, a second level of VOCs, the second level indicating a level of VOCs in the interior of the vehicle following the VOC removal operation.

Figure 1:
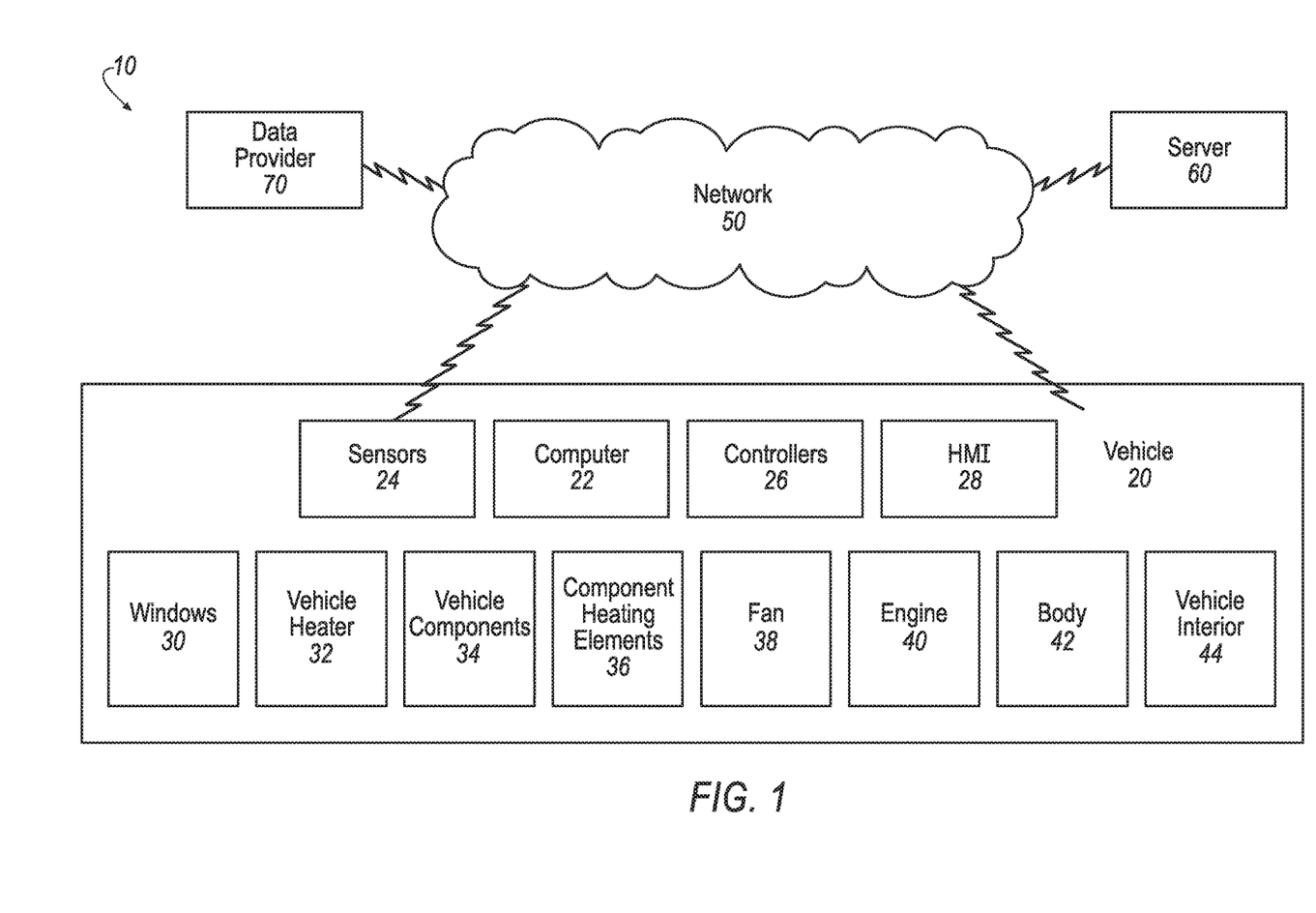
FIG. 1 is a block diagram of an exemplary system for expediting the removal of VOCs from a new vehicle, thereby remediating odor caused by VOCs.

FIG. 1 is a diagram of an exemplary system 10 for expediting the removal of VOCs from a vehicle 20 by heating the interior 44 of the vehicle 20 and venting the VOCs from the vehicle 20.

The system 10 includes the vehicle 20, network 50, one or more servers 60, and one or more data providers 70.

The vehicle 20 is generally a land-based, autonomous vehicle having three or more wheels, e.g., a passenger car, light truck, etc. The vehicle 20 includes a computer 22, one or more sensors 24, one or more controllers 26, a human-machine interface (HMI) 28, windows 30, a vehicle heater 32, a plurality of vehicle components 34 that may include component heating elements 36 such as seats, a steering wheel, interior mirrors, etc., one or more fans 38 and an engine 40. The component heating elements 36 may be, for example, electrical resistance heaters, which convert electrical energy to heat.

The vehicle 20 includes a body 42 encompassing the vehicle 20 which forms an interior 44, the interior 44 being a space defined on an inside of the body 42 for carrying vehicle users, cargo, etc., and which contains the seats 34, a steering wheel 34, interior mirrors 34, and other components 34.

The vehicle 20 can be an autonomous or semi-autonomous vehicle. In an autonomous vehicle 20 the computer 22 controls the vehicle 20 by sending instructions to controllers 26 including controllers 26 for steering, propulsion (e.g., a powertrain with electric and/or internal combustion elements), and braking; in a semi-autonomous vehicle 20 the computer 22 controls one or two of steering, propulsion, and braking.

The computer 22 includes a processor and a memory. The memory includes one or more types of computer-readable media, and storing instructions executable by the processor for performing various operations, including as disclosed herein. Further, the computer 22 may include and/or be communicatively coupled to one or more other computers, including vehicle components such as the sensors 24, controllers 26, and HMI 28, which likewise as is known may include respective processors and memories. Communications, i.e., communicative coupling, may be performed via a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

As described in additional detail below, the computer 22 is programmed to detect a condition or set of conditions related to a status of the vehicle 20 and an environment in which the vehicle 20 is operating that support the expedited removal (i.e., removal at a faster rate than would occur without the remediation described herein) of volatile organic compounds (VOCs) from the vehicle 20. The computer 22 is programmed, based on the detection, to take actions to expedite the removal of the VOCs, i.e., to increase a rate of off-gassing. Off-gassing, as that term used herein, is the release of volatile organic compounds from materials such as plastics, leather, wood, etc. into the air of the interior 44 of the vehicle 20. The actions may include instructing controllers 26 to navigate the vehicle 20 to a location to implement a VOC removal operation, for example a sunny location to take advantage of direct sunlight, or an open (outdoor) location which may or may not be in shadow, that allows the release of exhaust gasses such that the vehicle engine for can be operated for heating. The actions may further include sending instructions to vehicle controllers 26 to activate the vehicle heater 32; activate vehicle component heating elements 36; open windows 30, activate fans 38, etc.

The sensors 24 are communicatively coupled with the computer 22 and may be programmed to collect data related to the vehicle 20 and the environment in which the vehicle 20 is operating. By way of example, and not limitation, sensors 24 may include cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, a global positioning system (GPS), etc.

The controllers 26 include computers communicatively coupled with the computer 22, and may further include actuators such as motors, solenoids, relays, switches, etc. The controllers 26 are programmed to receive instructions from the computer 22, and based on the instructions, take actions such as navigating the vehicle 20, opening or closing a window 30, turning on or off a component heating element 36, etc.

The human machine interface (HMI) 28 is communicatively coupled to the computer 22 in a known manner as described above and includes one or more output devices such as a display, lamps, speakers, etc., for communicating data to a user. The HMI 28 further includes one or more input devices such as a touch screen display, buttons, a mouse, a keyboard, a microphone, a gesture recognition device, switches, etc., for receiving input from the user.

The HMI 28 may be programmed to receive input from a user of the vehicle 20. Input from the user may include destinations for the vehicle 20, a schedule for the vehicle 20, etc. Input from the user may further include user preferences such as the preference to expedite the removal of VOCs.

The vehicle 20 includes one or more windows 30. As described below, during a VOC removal operation the computer 22 may open, via a controller 26, the windows 30 to allow the vehicle 20 to be vented.

Additionally, during a VOC removal operation, the computer 22 may, via controllers 26 (1) activate the vehicle heater 32 to heat the interior 44 of the vehicle 20, activate component heating elements 36 to heat the interior 44 of the vehicle 20, activate one or more fans 38 to ventilate the interior 44 of the vehicle 20, and operate the engine 40. Operating the engine 40 may supply energy and/or heat to operate the windows 30, vehicle heater 32, component heating elements 36, vehicle fan 38, etc.

The network 50 represents one or more mechanisms by which the vehicle 20, the one or more servers 60, and the one or more data providers 70 communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

The types of wireless communications may include one or more of cellular, Bluetooth, IEEE 802.11 (typically, Wi-Fi), dedicated short range communications (DSRC), two-way satellite (e.g., emergency services), one-way satellite (e.g., receiving digital audio radio broadcasts), AM/FM radio, etc.

The server 60 is a computer including a processor and a memory, the memory storing instructions which may be executed by the processor. The server 60 can communicate, via the network 50 to the vehicle 20 computer 22, and the data providers 70.

The server 60 may be programmed to receive data from the vehicle 20 related to the status of VOC removal for the vehicle 20, such as data indicating actions or results of action taken by the computer 22 to remove VOCs from the vehicle 20. Additionally, the server 60 may be programmed to receive data from the data provider 70. For example, during a period of time that the vehicle 20 is engaging in a VOC operation, the server 60 may receive data from the data provider 70 indicating weather conditions at a location where the vehicle 20 is parked.

The system 10 may include one or more data providers 70. The data providers 70 are computers communicatively coupled, via the network 50, to the vehicle 20 and the server 60. The data providers 70 provide data such as GPS data indicating a location of the vehicle 20, weather conditions at the location of the vehicle 20 or at a target location for the vehicle 20 for removing VOCs (for example, information indicating sunny parking places within a predetermined distance of the vehicle 20), traffic data, air quality data, etc., that the vehicle 20 or the server 60 may use to determine actions or results of actions related to the removal of VOCs from the vehicle 20.

Figure 2:
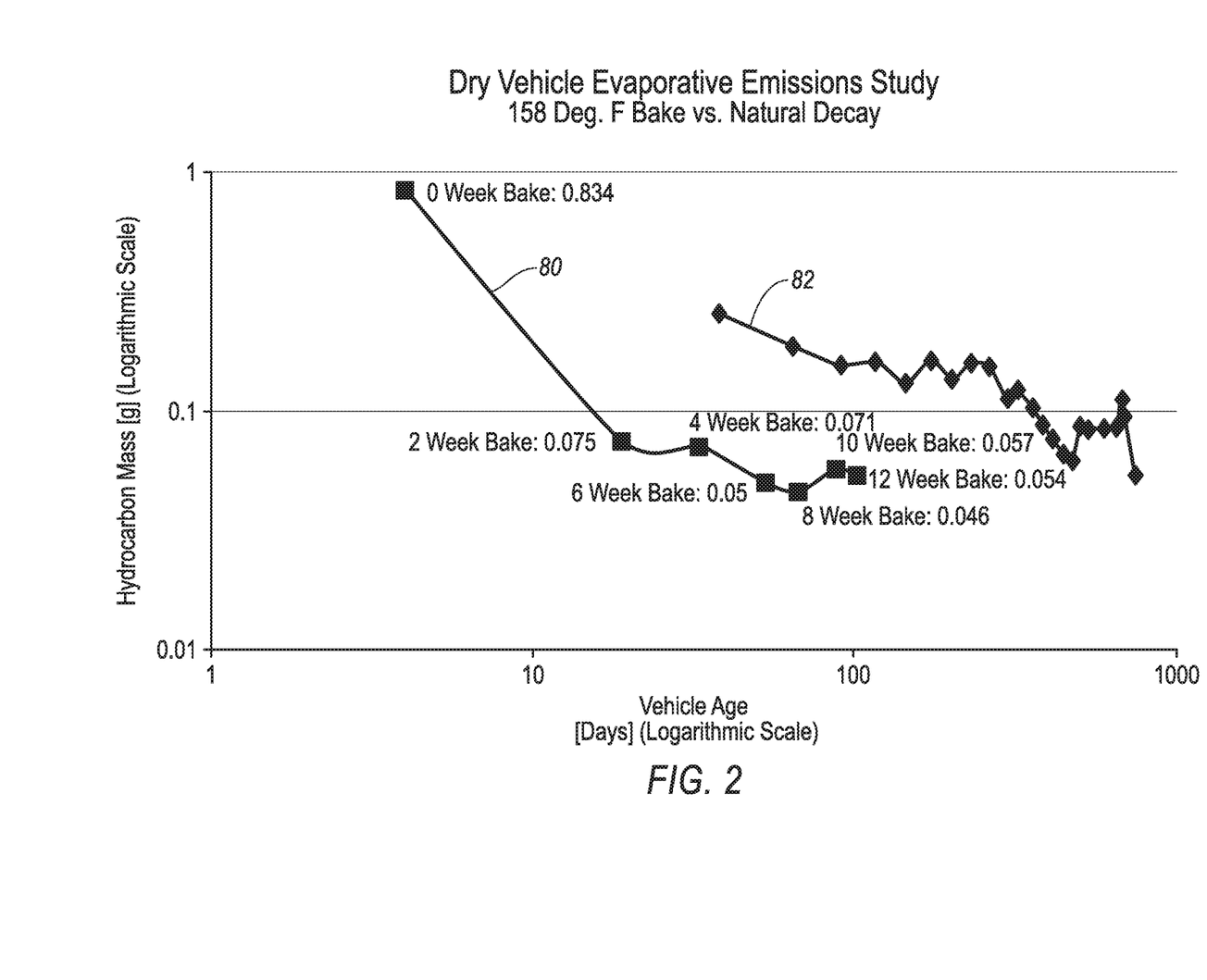
FIG. 2 is a graph showing exemplary plots of evaporative emissions in a vehicle.

Heat accelerates the off-gassing of volatile organic compounds (VOCs) from materials in the vehicle 20. FIG. 2 is a graph showing exemplary plots 80, 82 of evaporative emissions respectively in a vehicle during baking and during operation under standard conditions. The exemplary plot 80 shows hydrocarbon mass as a function of time for an exemplary vehicle 20 that is baked at 158° F. As can be seen, the hydrocarbon mass drops to less than 10% of its original value after approximately two weeks of baking at 158° F.

Exemplary plot 82 shows the natural decay hydrocarbon mass as a function of time for an exemplary vehicle 20. The plot 82 indicates that, for example, at a vehicle age of 100 days, the level of hydrocarbon following natural decay remains substantially higher than after two weeks of baking at 158° F.

In the system 10, off-gassing of VOCs in the vehicle 20 is accelerated by detecting a condition or set of conditions related to the status of the vehicle 20 and the environment in which the vehicle 20 is operating that support the removal of VOCs, heating the vehicle 20, and venting the VOCs out of the vehicle 20. For example, conditions such as temperature, humidity, etc., can affect off-gassing. Heating the vehicle 20 can be accomplished, e.g., by navigating the vehicle 20 to a location where there is direct sunlight. Heating the vehicle 20 can further include navigating the vehicle 20 to a location, for example outdoors, where the vehicle 20 can run the engine 40 to generate additional heat within the vehicle 20.

Figure 3:
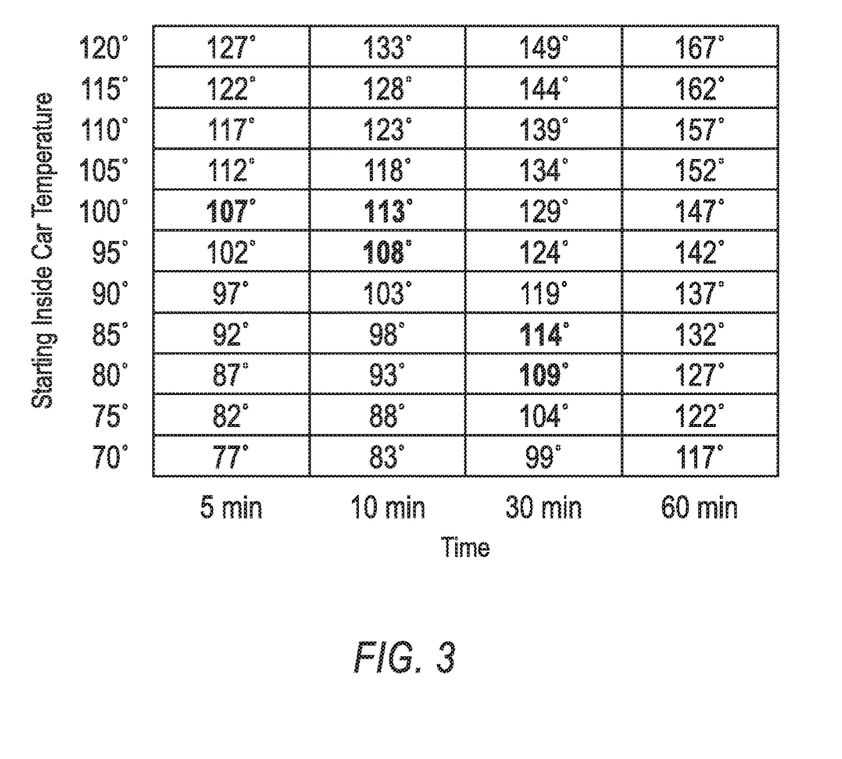
FIG. 3 is a table of exemplary cabin temperatures of a vehicle sitting in direct sunlight for varying time periods.

FIG. 3 is a table of cabin temperatures in an example vehicle 20 when exposed to direct sunlight for varying time periods. For example, for the exemplary vehicle 20 at a starting temperature of 70° F., the temperature inside the cabin increases to 117° F. after 60 minutes of sitting in direct sunlight. Accordingly, one of the strategies implemented by the computer 22 to accelerate the removal of VOCs is to navigate the vehicle 20 to a sunny location and allow the interior 44 of the vehicle 20 to be heated by the sunlight.

Figure 4A:
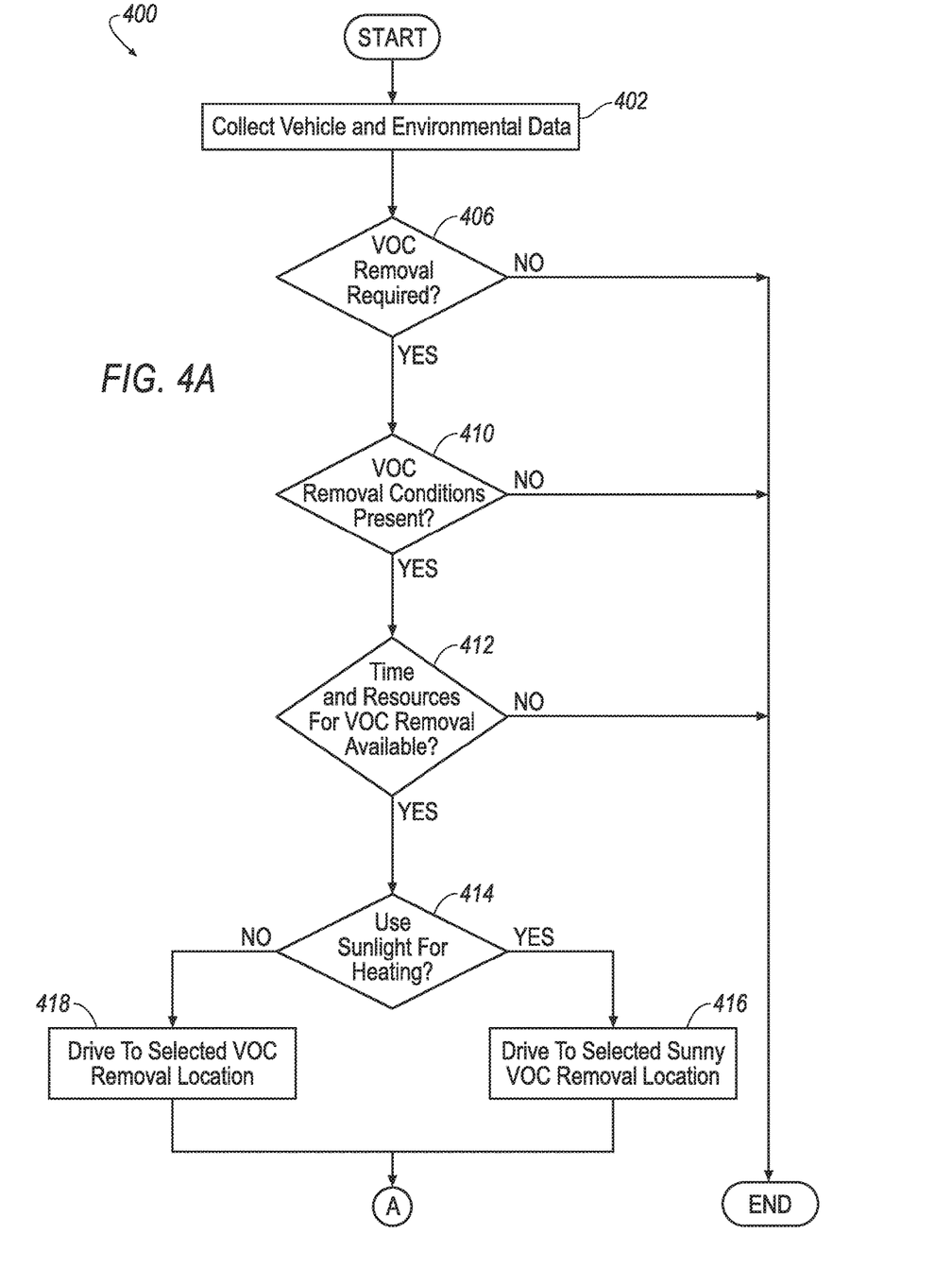
FIGS. 4A and 4B are a diagram of an exemplary process for expediting the removal of the new car smell from a vehicle.
Figure 4B:
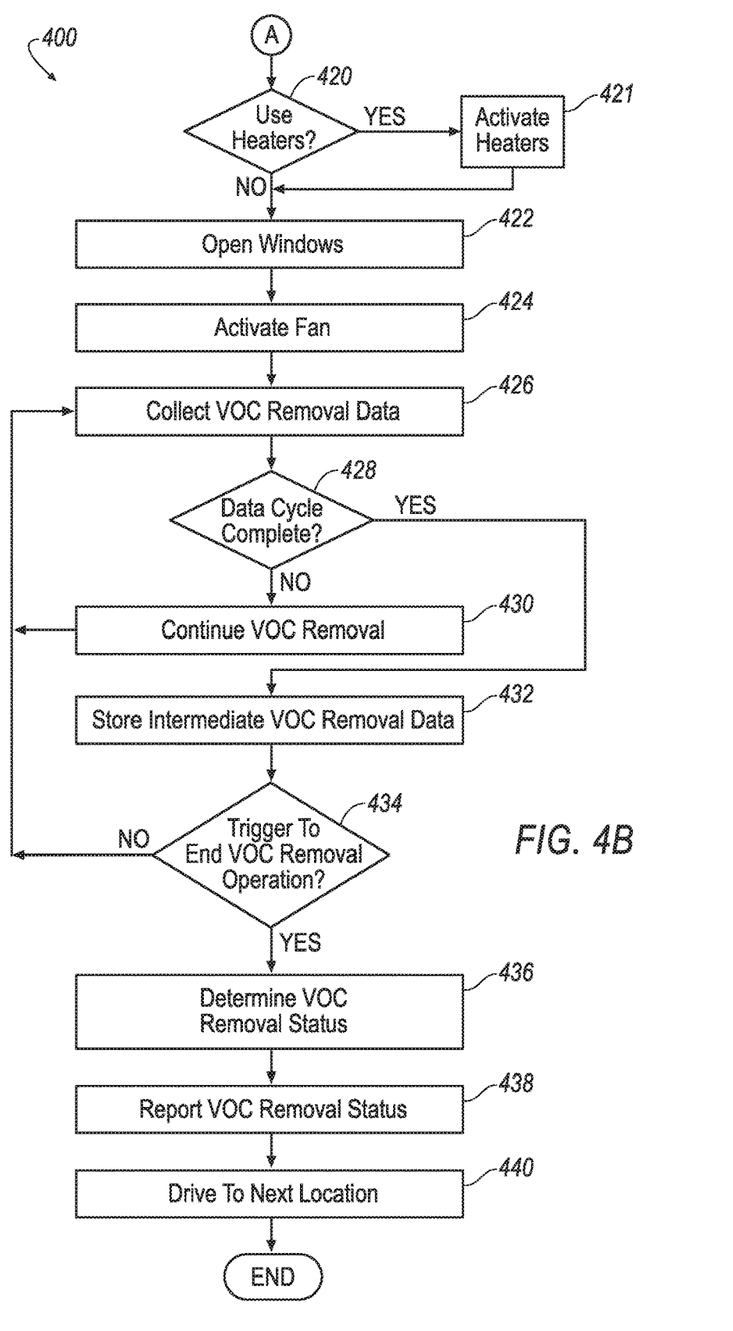

FIGS. 4A and 4B are a diagram of an exemplary process 400 for expediting the removal of VOCs from the exemplary vehicle 20. The process 400 is executed by the vehicle 20 in the case that a user has requested, for example, via the HMI 28, expedited removal of VOCs. Upon detecting a trigger event, for example that the vehicle 20 is turned on, the computer 22 starts the process 400. The process 400 starts in a block 402.

In the block 402, the computer 22 collects vehicle data and environmental data. In particular, the computer 22 collects data from the vehicle 20 which may indicate whether conditions for VOC removal are present. For example, the computer 22 may collect data regarding the schedule of the vehicle 20, the location of the vehicle 20, the recent usage of the vehicle 20, a temperature of air in the interior 44 of the vehicle 20, a temperature of the engine 40, etc.

The computer 22 may further collect data regarding the environment outside the vehicle 20. For example, the computer 22 may collect data regarding the current and predicted weather at locations within a predetermined distance of the vehicle 20, the current and predicted ambient temperature within a predetermined distance of the vehicle 20, the time of day, traffic conditions within a predetermined distance of the vehicle 20, etc. The computer 22 may further collect user data regarding preferences such as whether the user requested volatile organic compound removal from the vehicle 20 in an expedited fashion; under what conditions the user would like the vehicle 20 engage in a VOC removal operation, etc. For example, the user may specify that navigating the vehicle 20 to a location to be heated by direct sunlight is acceptable, but that running the engine 40 of the vehicle 20 to heat the vehicle 20 is not acceptable.

The computer 22 may further collect data reflecting vehicle usage patterns (vehicle use data). For example, the computer 22 may collect data such as GPS data indicating a location where the vehicle 20 is typically parked for extended periods of time (parked location). Parking the vehicle 20 is defined herein as leaving the vehicle 20 in a location unoccupied by a user. An "extended period of time" is a time period greater than a predetermined period of time, e.g., one hour. The vehicle 20 can be determined to be typically parked at a location for an extended period of time, when, for example, the vehicle 20 remains parked in the location for greater than the predetermined period for a percentage of times greater than a predetermined percentage of times. The predetermined percentage of times can be, for example, 80%.

The computer 22 may further collect data from the user via the HMI 28 indicating addresses where the vehicle 20 is likely to be parked for extended periods of time such as the user's home address or the user's work address.

Upon collecting vehicle and environmental data, process 400 continues in a block 406.

In the block 406, the computer 22 determines whether VOC removal is required based on (1) a current level or estimated level of VOCs in the vehicle 20 or (2) based on user feedback. The level of VOCs is a measure of the density of VOCs in the air in the interior 44 of the vehicle 20, and may be expressed in units of parts per million (ppm).

The computer 22 may check to determine whether a level, or estimated level, of VOCs in the vehicle 20 remains above a predetermined level that requires further expedited removal of VOCs from the vehicle 20. Densities as low as 30-50 ppm can be enough to trigger human detection of a scent. Accordingly, the predetermined level may be set, for example, to 30 ppm. As described below, the computer 22, based on vehicle and environmental parameters, is programmed to estimate a level of VOCs remaining in the vehicle 20.

Additionally or alternatively, the vehicle 20 may inquire of the user of the vehicle 20, via the HMI 28, whether the user considers, based for example on the remaining odor in the vehicle 20, that the VOCs remain at a level that requires further expedited VOC removal.

In the case that the level/estimated level of VOCs is still above a predetermined level or, that the user indicates that the VOCs remain at a level that require further expedited removal, the computer 22 determines that expedited VOC removal is still required. The process 400 continues in a block 410. Otherwise, the process 400 ends.

In the block 410, the computer 22 determines, based on the vehicle and environmental data, whether conditions for VOC removal are present. Conditions for VOC removal may depend on the availability of locations for executing a VOC removal operation within a predetermined distance of a current location of the vehicle. Conditions for VOC removal may further depend on weather conditions such as the current or predicted temperature and a current or predicted amount of sunlight, the time of day, an amount of traffic, etc.

Locations for executing a VOC removal operation are locations where the vehicle 20 can park plus one or more additional conditions. In the case of VOC removal based on heating the vehicle 20 with sunlight, the location for executing VOC removal includes areas where the vehicle 20 can be parked in direct sunlight, i.e., without the sunlight be blocked by other structures, such as buildings or trees. In the case of VOC removal based on heating the vehicle 20 with the vehicle heater 32 and component heating elements 36, the location for executing VOC removal includes outdoor areas where the vehicle 20 can run the engine 40 and exhaust combustion by-products (engine exhaust). In some cases, the computer 22 may heat the vehicle 20 both with sunlight and with the vehicle heater 32 and component heating elements 36. In this case the location would need to accommodate both parking the vehicle 20 in direct sunlight, and exhausting combustion by-products.

One condition for executing a VOC removal operation may be that a current location of the vehicle 20 is within a predetermined distance of a location for executing a VOC removal operation. The predetermined distance may be, for example, a distance of 10 miles.

Weather conditions that support a VOC removal operation are generally conditions that cause/allow the interior 44 of the vehicle 20 to heat up quickly, and/or with minimal expenditure of energy. Examples of conditions that support a VOC removal operation are a high ambient temperature and a high intensity of direct sunlight. For example, an ambient temperature of 85° F. may be a condition that supports a VOC removal operation Similarly, an availability of direct sunlight with an intensity greater than a predetermined intensity, e.g., 400 W/meter$^2$, may support a VOC removal operation.

The ambient temperature and intensity of direct sunlight may be considered together. For example, the computer 22 may include a table indicating combinations of ambient temperatures and intensities of direct sunlight that support a VOC removal operation.

The computer 22 may further be programmed to determine whether a temperature of the interior 44 and/or the temperature of the engine 40 support a VOC removal operation. For example, the computer 22 may be programmed to determine that an engine temperature above a predetermined temperature, for example 180° F., or an interior temperature above a predetermined temperature, for example 70° F., supports a VOC removal operation.

The computer 22 may evaluate the above conditions in combination. The computer 22 may maintain a table or the like of combinations of conditions that support a VOC removal operation. For example, the table may identify sets of conditions that allow the interior 44 of the vehicle 20 to be heated to a target temperature, for example 90° F., within a target period of time, for example 15 minutes.

In the case that the computer 22 detects a condition or set of conditions that support a VOC removal operation, the process 400 continues in a block 412. Otherwise, the process 400 ends.

In the block 412, the computer 22 determines whether there is likely sufficient time and/or resources available for a VOC removal operation. The determination may be based on current operating conditions of the vehicle 20 and/or a schedule for the vehicle 20.

Initially, the computer 22 may be programmed to determine whether there is sufficient time available for the VOC removal operation. A minimum period of time may be specified for conducting a VOC removal operation. The minimum period of time may be a fixed time, such as one hour. Alternatively, the computer 22 may calculate a minimum period of time based on conditions. For example, the specified conditions for calculating the minimum time period may be that the vehicle 20 has time to drive to a location for the VOC removal operation, heat the interior 44 of the vehicle 20 to a predetermined temperature, for example 90° F., maintain the interior temperature at the predetermined temperature for at least a predetermined time period, for example 30 minutes, and return to a destination to pick up a user and cool down the interior 44 to a second predetermined temperature, for example 70° F.

After determining a minimum time period for the VOC removal operation, the computer 22 is programmed to determine whether an amount of time is available greater than the minimum time is available. If a schedule is available for the vehicle 20, the computer 22 may make the determination based on the schedule. For example, based on input from a user, the vehicle 20 may maintain a schedule indicating the next time the vehicle 20 is likely required to provide transportation. Based on the schedule, the computer 22 may determine whether the minimum time period is available.

Alternatively, the computer 22 may determine that there is likely sufficient time available for a VOC removal operation based on a current location. As an example, the computer 22 may determine that the vehicle 20 has just been parked at a location where the user typically parks the vehicle 20 for an extended period of time such as at the user's home, or at the user's place of work. Based on being parked at one of these locations, the computer 22 may, in the absence of a schedule indicating otherwise, determine that the user will likely not need to use the vehicle 20 for the minimum time period.

In addition to considering whether sufficient time is available, the computer 22 may be programmed to determine the availability of other resources. For example, if the computer 22 is intending to use only, or primarily, sunlight to heat the interior of the vehicle 20, the computer 22 may determine whether there remains sufficient daylight to heat the interior 44 by the sun for the minimum time period. In the case that the computer 22 is intending to user only or primarily heat from the vehicle heater 32 and component heating elements 36, the computer 22 may determine whether sufficient fuel is available for operating the vehicle heater 32 and component heating elements 36 for the minimum time period. As above, the computer 22 may further make a determination if combinations of sunlight and fuel are available for the VOC removal operation. The computer 22 may, for example, maintain a table of combinations of amounts (periods of time) of sunlight and amounts of fuel required to execute a VOC removal operation for the minimum time period.

In the case that the computer 22 determines that there is, or likely is, sufficient time, sunlight and/or fuel for conducting the VOC removal operation, the process 400 continues in a block 414. Otherwise, the process 400 ends.

In the block 414, the computer 22 determines whether the conditions support heating the vehicle 20 with, or primarily with, sunlight. The computer 22 collects data, for example weather data from a data provider 70, or data from sensors 24 on the vehicle 20. Based on an amount (intensity) of sunlight, and/or based on a predicted ambient temperature, the computer 22 determines whether the vehicle 20 can be heated primarily by sunlight. For example, weather data from the data provider 70 may indicate that the day is clear and that the ambient temperature is 80 F. The computer 22 may determine that based on these conditions, a time to heat the interior 44 of the vehicle 20 to 90 F. when parked in a sunny location is within a predetermined time period. A sunny location can be defined as a location with direct sunlight at an intensity above a predetermined intensity, for example, 400 Watts/meter$^2$.

As another example, data from a sensor 24 on the vehicle 20 while the vehicle 20 is outdoors may indicate an intensity of received direct sunlight. Based on the intensity of received direct sunlight being above a predetermined level, the computer 22 may determine that the conditions support heating the interior 44 with, or primarily with sunlight, for VOC removal.

Upon determining that there is sufficient sunlight to heat the interior of the vehicle 20 with, or primarily with, sunlight, the process 400 continues in a block 416.

In other cases, the computer 22 may determine that the conditions do not support heating the interior 44 with or primarily with sunlight. For example, it may be an overcast day, with little or no sunlight. As another example, the day may be partly cloudy, and the ambient temperature may be below a minimum temperature, for example 25° F., such that the sunlight will not be able to raise the interior temperature to a predetermined temperature, such as 90° F. for VOC removal. In the case that the computer 22 determines that the conditions do not support heating the interior 44 with, or primarily with sunlight, the process continues in a block 418.

In the block 416, the computer 22 may navigate the vehicle 20 from a current location to a location to receive direct sunlight. For example, the computer 22 may navigate the vehicle 20 to a nearby parking lot that is not subject to shadows from trees or surrounding buildings, or more specifically may seek a parking spot that will not be in shadow for the period of time during which the computer 22 intends to execute the VOC removal operation. A nearby parking lot may be, for example, a parking lot within 10 miles of the current location for the vehicle 20. Upon navigating the vehicle 20 to the location to receive direct sunlight, process 400 continues in a block 418.

In the block 418, the computer 22 may navigate the vehicle 20 to a location suitable to execute the VOC removal operation when conditions do not support heating the interior 44 with, or primarily with sunlight. For example, the computer 22 may navigate the vehicle 20 to an open, outdoor location, where the computer 22 may run the engine 40 of the vehicle 20 in order to generate heat. Upon navigating the vehicle 20 to the suitable location to execute the VOC removal operation, the process 400 continues in a block 420.

In the block 420, the computer 22 is programmed to determine whether to activate the vehicle heater 32 and/or component heating elements 36 to heat the interior 44 of the vehicle 20. The computer 22 may make the determination based on weather conditions, and/or based on input from the user.

In a first case, wherein the computer 22 has determined that conditions do not support heating the interior 44 with or primarily with sunlight, as described above with regard to the block 414, the computer 22 activates the vehicle heater 32 and/or the component heating elements 36 in the block 420.

In a second case, wherein the computer 22 has determined that conditions do support heating the interior 44 with or primarily with sunlight, the computer 22 may be further programmed to determine whether to supplement heat from sunlight with heat from the vehicle heater 32 and/or the component heating elements 36. The computer 22 may make the determination based on weather and vehicle conditions. For example, the computer 22 may be programmed to determine not to use the vehicle heater 32 and/or the component heating elements 36 in a case that sunlight can heat the interior 44 to a predetermined temperature (e.g., 90° F.) within a predetermined time period (e.g., 15 minutes).

In other cases, the computer 22 may be programmed to make the determination based on user input. For example, the user may specify that the computer 22 should not use the vehicle heater 32 or component heating elements 36 at all to heat the vehicle 20 for VOC removal, or specify that the vehicle heater 32 and component heating elements 36 should only be used when the outdoor ambient temperature is below a predetermined temperature, for example 70° F. The computer 22 may maintain one or more table indicating weather conditions and/or user specified conditions that indicate whether the computer 22 should activate the vehicle heater 32 and/or component heating elements 36.

In the case that the computer 22 determines to activate the vehicle heater 32 and/or component heating elements 36, the process 400 continues in a block 421. Otherwise, the process 400 continues in a block 422.

In the block 421, the computer 22 activates the vehicle heater 32 and/or one or more component heating elements 36 in the vehicle 20 in order to heat the interior 44 of the vehicle 20. The computer 22 sends instructions to one or more controllers 26 to heat the vehicle 20. The computer 22 further sends instructions to one or more controllers 26 to activate one or more component heating elements 36 to further heat the interior 44 of the vehicle 20. In order to operate the vehicle heater 32 and provide energy to the component heating elements 36, the computer 22 may further send instructions to turn on the engine 40 of the vehicle 20. Upon turning on one or more of the vehicle heater 32, the component heating elements 36, and the engine 40, process 400 continues in a block 422.

In the block 422, the computer 22 opens the windows 30 of the vehicle 20. The computer 22 sends instructions to one or more window controllers 26 to open the windows 30 in order to allow VOCs in the interior 44 of the vehicle 20 to escape into the atmosphere. The computer 22 may open the windows immediately after the block 420 or 421. Alternatively, the computer 22 may wait a fixed period of time, for example five minutes, for the interior 44 to heat up before opening the windows 30. As another alternative, the computer 22 may monitor the temperature of the interior 44, and open the windows after the interior temperature reaches a predetermined temperature, for example 90 F.

In order to reduce the likelihood of people breaking into the vehicle 20 or removing objects from the vehicle 20, the computer 22 may only open the windows 30 by a small predetermined amount, for example 0.25 inches. Upon opening the windows 30, the process 400 continues in a block 424.

In the block 424, the computer 22 activates one or more fans 38 in the vehicle 20 in order to vent the VOCs out of the vehicle 20 during the VOC removal operation. The computer 22 sends instructions to one or more controllers 26 to turn on associated fans 38. Upon turning on the fans 38, the process 400 continues in a block 426.

In the block 426, the computer 22 collects data for parameters related to the VOC removal operation. A non-limiting list of parameters related with the VOC removal operation include an interior temperature of the vehicle 20, an intensity of sunlight striking the vehicle 20 as measured by one or more sensors 24 in or on the vehicle 20, an amount of sunlight striking the vehicle 20 as measured by one or sensors 24 in or on the vehicle 20 over a period of time, a temperature of air flowing into the interior 44 of the vehicle 20 from the vehicle heater 32, a temperature of one or more components 34 of the vehicle such as seats, steering wheel, interior mirror, windshield, etc., an amount that each of the windows 30 of the vehicle 20 is open, a speed of one or more fans 38, weather conditions such as ambient temperature, wind speed and direction, amount of precipitation, humidity, etc. where the vehicle 20 is parked, and other parameters which may influence the rate of removal of VOCs from the vehicle 20.

In order to monitor the parameters related to the VOC removal operation, the computer 22 collects data from data sources such as the data providers 70, sensors 24 and controllers 26. Upon collecting the data, the process 400 continues in a block 428.

In the block 428, the computer 22 determines whether a data cycle is complete. The data cycle is a predetermined period of time, for example one minute, for measuring and storing parameters associated with the VOC removal operation. In the case that the data cycle is not yet complete, the process 400 continues in a block 430. In the case that the data cycle is complete, the process continues in a block 432.

In the block 430, the computer 22 continues the VOC removal operation. The process continues in the block 424.

In the block 432, which follows a block 428, the computer 22 stores intermediate data related to the VOC removal process. The computer 22 stores a time stamp together with the data. The process 400 continues in a block 434.

In a block 434 the computer 22 determines whether a trigger event has occurred to end the VOC removal operation. A trigger event to end the VOC removal operation may be an event indicating that the vehicle 20 is needed soon for transportation, or an event indicating that conditions are no longer suitable for executing the VOC operation.

For example, based on a schedule for the vehicle 20, or a request received from the user of the vehic1e20, the computer 22 may determine that the vehicle 20 is needed for transportation by the user. As another example, based on changing weather conditions or a predicted change in weather, e.g. it has started to rain or a data provider 70 predicts that it will start to rain within a predetermined period of time (e.g., five minutes); the computer 22 may determine to end the VOC removal operation. Upon detecting a trigger event to end the VOC removal operation, the process continues in a block 436. In the case that no trigger event is detected, process 400 continues in a block 426.

In the block 436, the computer 22 determines the VOC removal status of the vehicle 20. Based on the VOC removal data stored during the VOC removal operation, the computer 22 estimates a quantity of VOCs removed from the vehicle 20 during the operation. Based on the estimated quantity of VOCs removed for the vehicle 20, and an initial estimated of VOCs in the vehicle 20 (for example, following manufacture), the computer 22 estimates the quantity of VOCs still remaining to be removed from the vehicle 20. The computer 22 stores this data as an indicator of the vehicle VOC status.

In order to estimate the quantity of VOCs removed for the vehicle 20, the computer 22 may, for example utilize tables indicating a rate of VOC removal as a function of time and as a function of other parameters such as the VOC removal parameters identified above.

In some cases, a sensor 24 may be available that can measure an amount of VOCs in the interior 44. In this case, the computer 22 can determine the VOC removal status based on measured data.

Upon determining the VOC removal status, the process 400 continues in a block 438.

In the block 438, the computer 22 reports the VOC removal status. The computer 22 may for example report the VOC removal status to the server 60. The computer 22 may further report the VOC removal status to a user via the HMI 28. The computer 22 may still further store the VOC removal status in memory associated with the computer 22 for future use. Upon reporting the VOC removal status, the process 400 continues in a block 440.

In the block 440, the computer 22 may navigate the vehicle 20 to a next vehicle location. For example, the computer 22 may navigate the vehicle 20 pick up the vehicle user, or to park the vehicle 20 at the user's home, office, or at another location. Upon navigating the vehicle 20 to the next location, the process 400 ends.

The process 400 is described as being executed by the computer 22. Parts or all of the process 400 may be executed, however, by another computing device, such as the server 60, that is communicatively coupled with the computer 22 and/or other computing devices within the vehicle 20 such as the sensors 24 and controllers 26.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method comprising:
   detecting, based in part on a first location of a vehicle and weather data, a condition for removing volatile organic compounds (VOCs) from the vehicle, the first location being a current location of the vehicle;
   determining that a first level of VOCs in the vehicle is greater than a predetermined level;
   selecting a second location to expedite removal of the VOCs; and
   navigating the vehicle to the second location.

2. The method of claim 1 wherein the condition for removing volatile organic compounds includes an intensity of sunlight above a predetermined intensity.

3. The method of claim 1, wherein the condition for removing volatile organic compounds includes the second location being within a predetermined distance of the first location.

4. The method of claim 1, wherein the condition for removing volatile organic compounds includes an ambient temperature above a predetermined temperature.

5. The method of claim 1, wherein selecting the second location is based on an availability of sunlight with an intensity above a predetermined intensity at the second location.

6. The method of claim 1, wherein selecting the second location is based on the second location being an outdoor location.

7. The method of claim 1, further comprising executing a VOC removal operation including at least one of following actions:
   (1) opening at least one window of the vehicle;
   (2) activating at least one of a vehicle heater and a component heating element;
   (3) activating a fan; and
   (4) running an engine.

8. The method of claim 7, further comprising:
   recording one or more parameters related to the VOC removal operation, wherein the one or more parameters includes at least one of:
      a period of time for the VOC for at least one of the actions of the VOC removal operation;
      a temperature of an interior of the vehicle at one or more times during the VOC removal operation; and
      an intensity of sunlight measured by a sensor in the vehicle during the VOC removal operation.

9. The method of claim 8, further comprising:
   estimating, based on the parameters, a second level of VOCs, the second level indicating a level of VOCs in the interior of the vehicle following the VOC removal operation.

10. The method of claim 1, further comprising:
    determining that a vehicle user requested volatile organic compound removal from the vehicle.

11. The method of claim 1, further comprising:
    determining a minimum time period for removing VOCs from a vehicle, wherein detecting the condition for removing VOCs from the vehicle is based in part on the minimum time period.

12. The method of claim 11, wherein the minimum time period for removing VOCs from the vehicle is based in part on a required time to heat an interior of the vehicle to a target temperature.

13. The method of claim 11 wherein detecting the condition for removing VOCs from the vehicle further includes determining that the vehicle is not scheduled to be used for a period of time greater than the minimum time period for removing VOCs from the vehicle.

14. The method of claim 11, wherein detecting the condition for removing VOCs from the vehicle includes:
    predicting an amount of time the vehicle is available for removing VOCs from the vehicle; and
    determining that the predicted the amount of time available for removing VOCs from the vehicle is greater than the minimum time period for removing VOCs from the vehicle.

15. A computer, comprising a processor and a non-transitory memory, the memory storing instructions such that the computer is programmed to:
    detect, based in part on a first location of a vehicle and weather data, a condition for removing volatile organic compounds (VOCs) from the vehicle, the first location being a current location of the vehicle;
    determine that a first level of VOCs in the vehicle is greater than a predetermined level;
    select a second location to expedite removal of the VOCs; and
    navigate the vehicle to the second location.

16. The computer of claim 15 wherein the condition for removing volatile organic compounds includes an intensity of sunlight above a predetermined intensity.

17. The computer of claim 15, wherein the condition for removing volatile organic compounds includes an ambient temperature above a predetermined temperature.

18. The computer of claim 15, further programmed to execute a VOC removal operation including at least one of following actions:
    (1) opening at least one window of the vehicle;
    (2) activating at least one of a vehicle heater and a component heating element;

(3) activating a fan; and
(4) running an engine.

19. The computer of claim 18, further programmed to:
record one or more parameters related to the VOC removal operation, wherein the one or more parameters includes at least one of:
  a period of time for the VOC for at least one of the actions of the VOC removal operation;
  a temperature of an interior of the vehicle at one or more times during the VOC removal operation; and
  an intensity of sunlight measured by a sensor in the vehicle during the VOC removal operation.

20. The computer of claim 19, further programmed to:
estimate, based on the parameters, a second level of VOCs, the second level indicating a level of VOCs in the interior of the vehicle following the VOC removal operation.

* * * * *

UNITED STATES PATENT AND TRADEMARK OFFICE
CERTIFICATE OF CORRECTION

PATENT NO. : 10,246,103 B2
APPLICATION NO. : 15/585777
DATED : April 2, 2019
INVENTOR(S) : Aed M. Dudar et al.

Page 1 of 1

It is certified that error appears in the above-identified patent and that said Letters Patent is hereby corrected as shown below:

In the Claims

Column 13, in Line 45, Claim 2 replace "The method of claim 1 wherein" with – The method of claim 1, wherein –

Column 13, in Line 63, Claim 7 replace "including at least one of following" with – including at least one of the following –

Column 14, in Line 40, Claim 14 replace "determining that the predicted the amount of time" with – determining that the predicted amount of time –

Column 14, in Lines 63-64, Claim 18 replace "operation including at lease one of following" with – operation including at least one of the following –

Signed and Sealed this
Tenth Day of December, 2019

Andrei Iancu
*Director of the United States Patent and Trademark Office*